US012122144B2

(12) United States Patent
Murzynowski et al.

(10) Patent No.: US 12,122,144 B2
(45) Date of Patent: Oct. 22, 2024

(54) SYSTEM AND METHOD OF DRYING A MATERIAL DEPOSITED ON A WEB

(71) Applicant: Cryovac, LLC, Charlotte, NC (US)

(72) Inventors: Alan Ronald Murzynowski, Grand Island, NY (US); Theodore F. Cyman, Grand Island, NY (US); Daniel Edward Kanfoush, Grand Island, NY (US); Kevin John Hook, Grand Island, NY (US); Lawrence Albe Pilon, Hamburg, NY (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 17/928,652

(22) PCT Filed: Jun. 1, 2021

(86) PCT No.: PCT/US2021/035156
§ 371 (c)(1),
(2) Date: Nov. 30, 2022

(87) PCT Pub. No.: WO2021/247508
PCT Pub. Date: Dec. 9, 2021

(65) Prior Publication Data

US 2023/0294394 A1 Sep. 21, 2023

Related U.S. Application Data

(60) Provisional application No. 63/032,782, filed on Jun. 1, 2020.

(51) Int. Cl.
*B41F 23/04* (2006.01)
*B41F 19/00* (2006.01)

(52) U.S. Cl.
CPC ........ *B41F 23/0483* (2013.01); *B41F 19/007* (2013.01); *B41F 23/0413* (2013.01)

(58) Field of Classification Search
CPC .. B41F 23/04; B41F 23/0413; B41F 23/0483; B41F 19/007
See application file for complete search history.

(56) References Cited

U.S. PATENT DOCUMENTS 5,416,984 A * 5/1995 Murray ............... B41F 23/0479 34/392
6,606,948 B1 * 8/2003 Austin ............... B41F 23/0479 101/216

(Continued)

FOREIGN PATENT DOCUMENTS

DE 20206407 U1 9/2003
EP 2774766 A1 9/2014

*Primary Examiner* — David H Banh
(74) *Attorney, Agent, or Firm* — Jason R. Womer

(57) ABSTRACT

A drying system and method of operating the drying system to dry a printed shrinkable web are disclosed. A web transport is adapted to convey the printed web between a heating apparatus and a cooling apparatus. The heating apparatus directs heat toward the web and the cooling apparatus concurrently chills the web. A temperature sensing device is adapted to develop an indication of a temperature of the web and the controller is adapted to adjust a temperature of at least one of the heating apparatus and the cooling apparatus in accordance with such indication.

20 Claims, 8 Drawing Sheets

(56) References Cited

U.S. PATENT DOCUMENTS

| | | | | |
|---|---|---|---|---|
| 6,735,883 | B1 * | 5/2004 | Bria | F26B 13/104<br>34/526 |
| 2013/0206808 | A1 * | 8/2013 | Schnabel | B65H 23/04<br>226/195 |
| 2014/0102323 | A1 * | 4/2014 | Zagar | B41F 13/02<br>101/212 |

* cited by examiner

SYSTEM AND METHOD OF DRYING A MATERIAL DEPOSITED ON A WEB

CROSS-REFERENCE TO RELATED APPLICATIONS

This application claims priority to U.S. Patent Application Ser. No. 63/032,782, filed Jun. 1, 2020 and entitled System and Method of Drying a Material Deposited on a Web, the entirety of which is incorporated herein by reference.

BACKGROUND

The subject matter disclosed herein relates to printing systems and methods, and more particularly, to a system and method of drying a material deposited on a web.

High speed printing systems have been developed for printing on a substrate, such as a web of shrinkable polymeric film. Such a material typically exhibits both elasticity and plasticity characteristics that depend upon one or more applied influences, such as force, heat, chemicals, electromagnetic radiation, etc. Materials deposited on the web by an imaging unit of the printing system are typically dried before additional material is deposited by a subsequent imaging unit. Some webs, such as a shrinkable polymeric film, begin to shrink, deform, or otherwise become damaged if heated beyond a critical temperature. Drying of one or more material(s) deposited on such webs must be monitored and controlled so that sufficient heat is applied to dry the material deposited thereon without raising the temperature of the web beyond the critical temperature.

The discussion above is merely provided for general background information and is not intended to be used as an aid in determining the scope of the claimed subject matter.

BRIEF DESCRIPTION

A drying system and method of operating the drying system to dry a printed shrinkable web are disclosed. A web transport is adapted to convey the printed web between a heating apparatus and a cooling apparatus. The heating apparatus directs heat toward the web and the cooling apparatus concurrently chills the web. A temperature sensing device is adapted to develop an indication of a temperature of the web and the controller is adapted to adjust a temperature of at least one of the heating apparatus and the cooling apparatus in accordance with such indication.

According to one aspect, a drying system includes a heating apparatus, a cooling apparatus, a temperature sensing device disposed downstream of the cooling apparatus, and a controller. The system also includes a web transport adapted to convey a printed web between the heating apparatus and the cooling apparatus. The heating apparatus directs heat toward the web and the cooling apparatus concurrently chills the web. The temperature sensing device is adapted to develop an indication of a temperature of the web and the controller is adapted to adjust a temperature of at least one of heating apparatus and the cooling apparatus in accordance with such indication.

According to another aspect, a method for drying a material deposited on a shrinkable web includes the steps of conveying a printed web between a heating apparatus and a cooling apparatus, operating the heating apparatus to direct heat toward the web, operating the cooling apparatus to cool the web concurrently with the operation of the heating apparatus, receiving an indication of a temperature of the web, and adjusting a temperature of at least one of the heating apparatus and the cooling apparatus in accordance with the indication of the temperature.

Other aspects and advantages will become apparent upon consideration of the following detailed description and the attached drawings wherein like numerals designate like structures throughout the specification.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
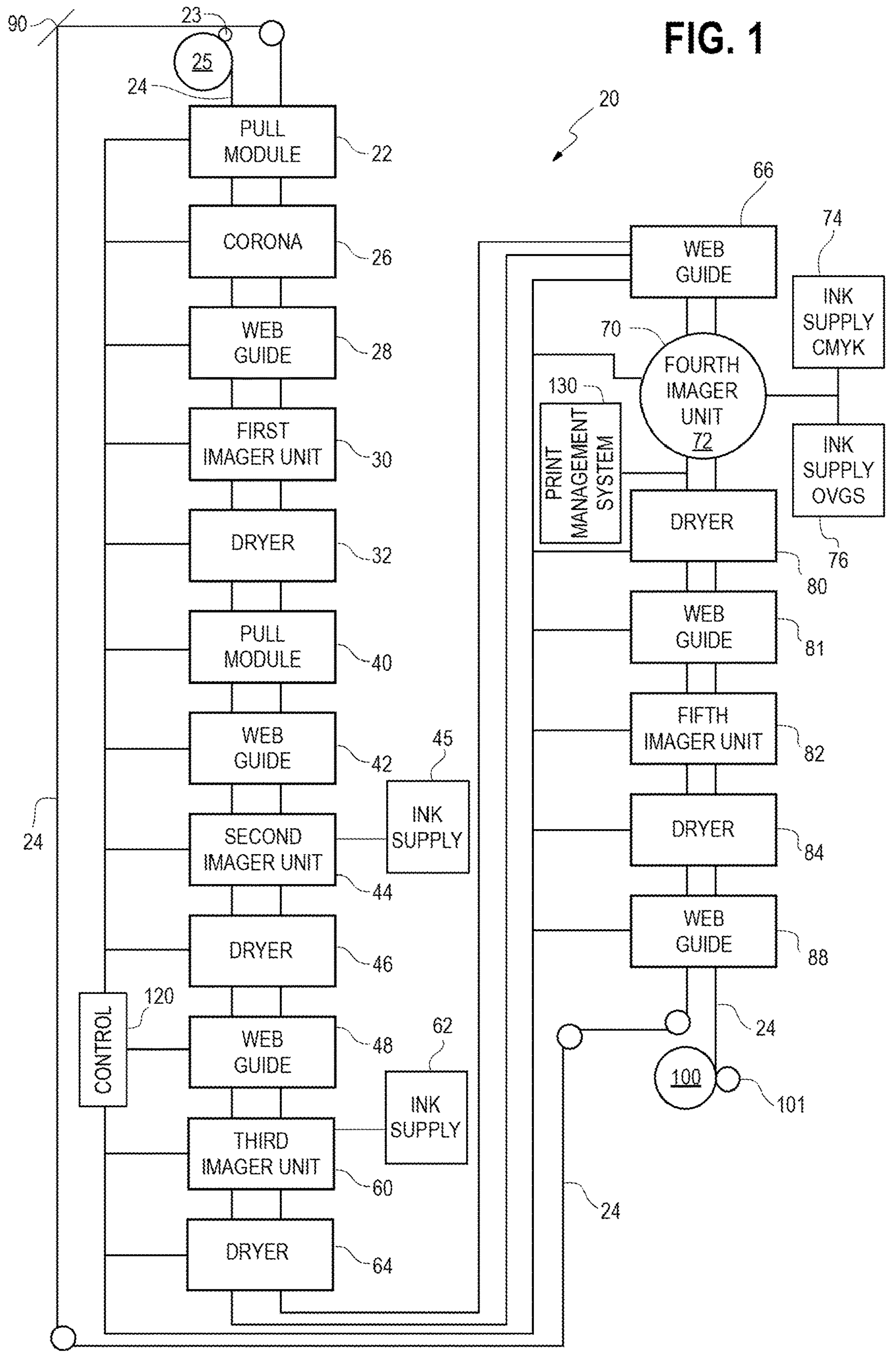
FIG. 1 is a simplified block diagram of an exemplary system for printing images and/or text on a substrate.

FIG. 1 shows an exemplary system 20 for printing content (e.g., images and/or text) on a substrate, such as a shrinkable plastic film used in food grade applications. It should be understood, however, that the system 20 may be used to print on any polymer or other flexible material that is dimensionally stable or unstable during processing for any application, e.g., other than food grade. The system 20 preferably operates at high-speed, e.g., on the order of zero to about 500 or more feet per minute (fpm) and even up to about 1000 fpm, although the system may be operable at a different speed, as necessary or desirable. The illustrated system 20 is capable of printing images and/or text on both sides of a substrate (i.e., the system 20 is capable of duplex printing) although this need not be the case. In the illustrated embodiment, a first side of a substrate is imaged by a sequence of particular units during a first pass, the substrate is then turned over and the other side of the substrate is imaged by all of the particular units or only by a subset of the particular units during a second pass. First portions of one or more of the particular units may be operable during the first pass and second portions of one or more of the particular units laterally offset from the first portions may be operable during the second pass. Also, one or more of the particular units may be capable of simultaneously treating and/or imaging both sides of the substrate during one pass, in which case such unit(s) need not be operable during the other pass of the substrate. In the illustrated embodiment, the first portions are equal in lateral extent to the second portions, although this is not necessarily the case. Thus, for example, the system may have a 52-inch width, and may be capable of duplex printing up to a 26-inch wide substrate. Alternatively, a 52-inch wide (or smaller) substrate may be printed on a single side (i.e., simplex printed) during a single production run. If desired, additional imager units and associated dryer and web guide units may be added in line with the disclosed imager units and other units so as to obtain full-width (i.e., 52 inches in the disclosed embodiment) duplex printing capability. Still further, a substrate having a different width, such as 64 inches (or larger or smaller width) may be accommodated.

Further, the illustrated system 20 may comprise a fully digital system that solely utilizes ink jet printers, although other printing methodologies may be utilized to image one or more layers, such as flexographic printing, lithographic offset printing, silk screen printing, intaglio printing, letterpress printing, etc. Ink jet technology offers drop on demand capability, and thus, among other advantages, allows high levels of color control and image customization.

In addition to the foregoing, certain ink jet heads are suitable to apply the high opacity base ink(s) that may be necessary so that other inks printed thereon can receive enough reflected white light (for example) so that the overprinted inks can adequately perform their filtering function. Some printhead technologies are more suitable for flood coating printing, like printing overcoat varnish, primers, and white, and metallic inks.

On the other hand, printing high fidelity images with high resolution printheads achieves the best quality. Using drum technology and printing with ink jet is the preferred way to maintain registration, control a flexible/shrinkable film substrate, and reproduce an extended gamut color pallet.

The system disclosed herein has the capability to print an extended gamut image. In some cases, the color reproduction required may need a custom spot color to match the color exactly. In these cases, an extra eighth channel (and additional channels, if required) can be used to print custom color(s) in synchronization with the other processes in the system.

Printing on flexible/shrinkable films with water-based inks has many challenges and require fluid management, temperature control, and closed loop processes. Thus, in the present system, for example, the ability to maintain a high-quality color gamut at high speed is further process controlled by sensor(s) that may comprise one or more calibration cameras to fine tune the system continually over the length of large runs.

As used herein, the phrase “heat-shrinkable” is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

Figure 2:
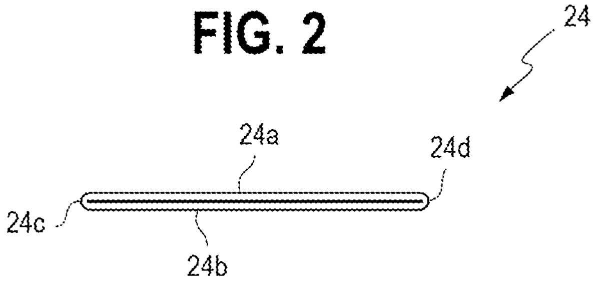
FIG. 2 is an end elevational view of a polymeric film to be imaged by the system of FIG. 1.

As shown in FIG. 1, the illustrated system 20 includes a first pull module 22 that unwinds a web of plastic web 24 from a roll 25 that is engaged by a nip roller 23 at the beginning of a first printing pass through the system 20. The web 24 may comprise a flattened cylinder or tube of plastic film comprising two layers having sides 24*a*, 24*b* (see FIG. 2) joined at side folds 24*c*, 24*d*, although the web 24 may instead simply comprise a single layer of material, if desired and as referred to above. Once unwound by the module 22, the web 24 may be processed by a surface energy modification system, such as a corona treatment unit 26 of conventional type, that increases the surface energy of the web 24. The corona treatment addresses an imaging condition that may be encountered when a large number of closely spaced drops are applied to a low surface energy impermeable material, which, if not compensated for, can result in positional distortion of the applied inks due to coalescence effects. The corona treatment module may be capable of treating both sides of the web 24 simultaneously. A first web guide 28 of conventional type that controls the lateral position of the web 24 in a closed-loop manner then guides the corona-treated web 24 a first imager unit 30. A first dryer unit 32 is operated to dry the material that is applied to the web 24 by the first imager unit 30. The material applied by the first imager unit 30 may be deposited over the entirety of the web 24 or may be selectively applied only to some or all areas that will later receive ink.

A second pull module 40 and a second web guide 42 (wherein the latter may be identical to the first web guide 28) deliver the web 24 to a second imager unit 44 that prints a material supplied by a first supply unit 45 on the web 24. A second dryer unit 46 is operable to dry the material applied by the second imager unit 44.

Thereafter, the web 24 is guided by a third web guide 48 (again, which may be identical to the first web guide 28) to a third imager unit 60 that applies material supplied by a second supply unit 62 thereon, such as at a location at least partially covering the material that was deposited by the second imager unit 44. A third dryer unit 64 is operable to dry the material applied by the third imager unit 60 and the web 24 is then guided by a fourth web guide 66 (that also may be identical to the first web guide 28) to a fourth imager unit 70 comprising a relatively high resolution, extended color gamut imager unit 70.

The imager unit 70 includes a drum 72 around which are arranged ink jet printheads for applying primary process color inks CMYK to the web 24 along with secondary process color inks orange, violet, and green OVG and an optional spot color ink S to the web 24 at a relatively high resolution, such as 1200 dpi and at a high speed (e.g., 100-500 fpm). The extended gamut printing is calibrated at the high printing speed. The drop sizes thus applied are relatively small (on the order of 3-6 pL). If desired, the imager unit 70 may operate at a different resolution and/or apply different drop sizes. The inks are supplied by third and fourth supply units 74, 76, respectively, and, in some embodiments, the inks are of the water-based type. The process colors comprising the CMYK and OVG inks enable reproduction of extended gamut detailed images and high-quality graphics on the web 24. A fourth dryer unit 80 is disposed downstream of the fourth imager unit 70 and dries the inks applied thereby.

Following imaging, the web 24 may be guided by a web guide 81 (preferably identical to the first web guide 28) and coated by a fifth imager unit 82 comprising an ink jet printer operating at a relatively low resolution and large drop size (e.g., 600 dpi, 5-12 pL size drops) to apply an overcoat, such as varnish, to the imaged portions of the web 24. The overcoat is dried by a fifth dryer unit 84. Thereafter, the web is guided by a web guide 88 (also preferably identical to the first web guide 28), turned over by a web turn bar 90, which may comprise a known air bar, and returned to the first pull module 22 to initiate a second pass through the system 20, following which material deposition/imaging on the second side of the web 24 may be undertaken, for example, as described above. The fully imaged web 24 is then stored on a take-up roll 100 engaged by a nip roll 101 and thereafter may be further processed, for example, to create shrink-wrap bags.

While the web 24 is shown in FIG. 1 as being returned to first the pull module 22 at the initiation of the second pass, it may be noted that the web may be instead delivered to another point in the system 20, such as the web guide 28, the first imager unit 30, the pull module 40, the web guide 42, or the imager unit 44 (e.g., when the web 24 is not to be pre-coated), bypassing front end units and/or modules, such as the module 22 and the corona treatment unit 26.

Further, in the case that the web 24 is to be simplex printed (i.e., on only one side) the printed web 24 may be stored on the take-up roll 100 immediately following the first pass through the system 20, thereby omitting the second pass entirely.

The web 24 may be multilayer and may have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils. The web 24 may have a film percent transparency (also referred to herein as film clarity) measured in accordance with ASTM D 1746-97 "Standard Test Method for Transparency of Plastic Sheeting", published April, 1998, which is hereby incorporated, in its entirety, of at least 15 percent, or at least 20 percent, or at least 25 percent, or at least 30 percent.

Preferably, the system 20 includes a first tension zone between the roll 25 (which is a driven roll) and the pull module 22, a second tension zone between the pull module 22 and the imager unit 30, a third tension unit between the imager unit 30 and the pull module 40, a fourth tension zone between the pull module 40 and the imager unit 44, a fifth tension zone between the imager unit 44 and the imager unit 60, a sixth tension zone between the imager unit 60 and the drum 72, a seventh tension zone between the drum 72 and the imager unit 82, and an eighth tension zone between the imager unit 82 and the take-up roll 100 (which is a driven roll). One or more tension zones may be disposed between the imager unit 82 and the pull module 22 and/or at other points in the system 20. Each of the elements defining the ends of the tension zones comprises, for example, a driven roll (which, in the case of the imager units 30, 44 60, 70, and 82, comprise imager drums) with a nip roller as described in greater detail hereinafter. Preferably, all of the tension zones are limited to about 20 feet or less in length. The web tension in each tension zone is controlled by one or more tension controllers such that the web tension does not fall outside of predetermined range(s).

The nature and design of the first, second, and third imager units 30, may vary with the printing methodologies that are to be used in the system 20. For example, in a particular embodiment in which a combination of flexographic and ink jet reproduction is used, then the first imager unit 30 may apply a composition comprising a clear primer and a dispersion of a white colorant, such as titanium dioxide, in a flood-coated fashion to the web 24. The second imager unit 44, which may comprise an ink jet printer or a flexographic unit, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a further embodiment, the first imager unit 30 comprises a flexographic unit that applies a white pigmented ink to the web 24, the second imager unit 44 comprises an ink jet printer or a flexographic unit that applies one or more metallic inks, and the third imager unit 60 comprises an ink jet printer or flexographic unit that applies a clear primer to the web 24.

In yet another embodiment that uses ink jet technology throughout the system 20, the first imager unit 30 comprising an ink jet printer may apply a composition comprising a clear primer and a dispersion of a white colorant, such as titanium dioxide, to the web 24. The second imager unit 44, which comprises an ink jet printer, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a still further embodiment, the first imager unit 30 comprises an ink jet printer that applies a white pigmented ink to the web 24, the second imager unit 44 comprises an ink jet printer that applies one or more metallic inks, and the third imager unit 60 comprises an ink jet printer that applies a clear primer to the web 24.

Any one or more of the imager units 30, 44, 60, 70, and 82 may be omitted or the functionality thereof may be combined with one or more other imager units. Thus, for example, in the case where a combined primer and white pigmented material are applied, the combination may be printed by one of the imager units 30 or 44 and the other of the imager units 30, 44 may be omitted.

In some embodiments each of the first, second, and third imager units 30, 44, 60 comprises a 600 dpi (dots per inch) inkjet printer that applies relatively large drops (i.e., at least 5-12 picoliters (pL)) each using piezoelectric ink jet heads, although the imager units 30, 44, and/or 60 may operate at a different resolution and/or apply different sizes of drops. Thus, for example, a printhead designed for use with metallic and precoating inks in the present system may have a resolution of 400 dpi and drop volume of 20-30 pL. The precoating material, white, and metallic inks have relatively heavy pigment loading and/or large particle sizes that are best applied by the relatively low resolution/large drop size heads of the imager units 30, 44, 60.

In alternative embodiments, one or more of the primer, white, and coating imager units may operate at a relatively high resolution and/or small drop size, such as 1200 dpi/3-6 pL.

The primer renders at least a portion of the surface of the web 24 suitable to receive later-applied water-based inks. It is preferable (although not necessary) to apply the primer just before the process and spot color inks are applied by the fourth imager unit 70 so that the such colors are directly applied to the dried primer.

Preferably, the fourth imager unit 70 comprises the above-described ink jet printer so that drop-on-demand technology may be taken advantage of, particularly with respect to print-to-print variability, high resolution, and the ability to control registration precisely.

The fifth imager unit 82 also preferably comprises an ink jet printer that operates at least at 1200 dpi or 2400 dpi, although it may instead be implemented by a different printing methodology, such as a flexographic unit.

As noted in greater detail hereinafter, a supervisory or global control system 120 is responsive to sensors (not shown in FIG. 1) and is responsible for overall closed-loop control of various system devices during a production run. A further control system comprising a print management control system 130 controls the various imager units also in a closed-loop fashion to control image reproduction as well as color correction, registration, correct for missing pixels, etc.

Also in the illustrated embodiment, each dryer unit 32, 46, 64, 80, and 84 is controlled by an associated closed-loop dryer management system (not shown in FIG. 1) during printing to, among other things, minimize image offsetting (sometimes referred to as "pick-off"), which can result in artifacts that may result from improper or insufficient drying of ink deposited on the web causing undried ink/coating to adhere (i.e., offset) to one or more system handling components, such as idler roller(s) or other component(s), and be transferred from such system handling component(s) to other portions of the web.

In the case of a partially or completely ink jet implemented system, the printheads used by the first through fifth imager units 30, 44, 60, 70, and/or 82 may be of the same or different types, even within each printer, and/or, as noted previously, different printing methodologies could be used to apply inks/coatings. In any event, the global control system 120 and/or the print management control system 130 is (are) programmed to convert input data representing the various layers, such as data in a print-ready source format (e.g., Adobe Portable Document Format or PDF) to bitmaps by a ripping process or other page representation(s) during pre-processing taking into account the operational characteristics of the various printhead types/printing methodologies (such as the resolution(s) and drop size(s) to be deposited) and properties of the web (such as shrinkage when exposed to heat).

The pull module 22, the web guides 42, 48, 66, and 81, and the rollers described above provide a web transport that conveys the web 24 past the imager units 30, 44, 60, 70, and 82 and corresponding dryer units 32, 46, 64, 80, and 84, respectively.

Figure 3:
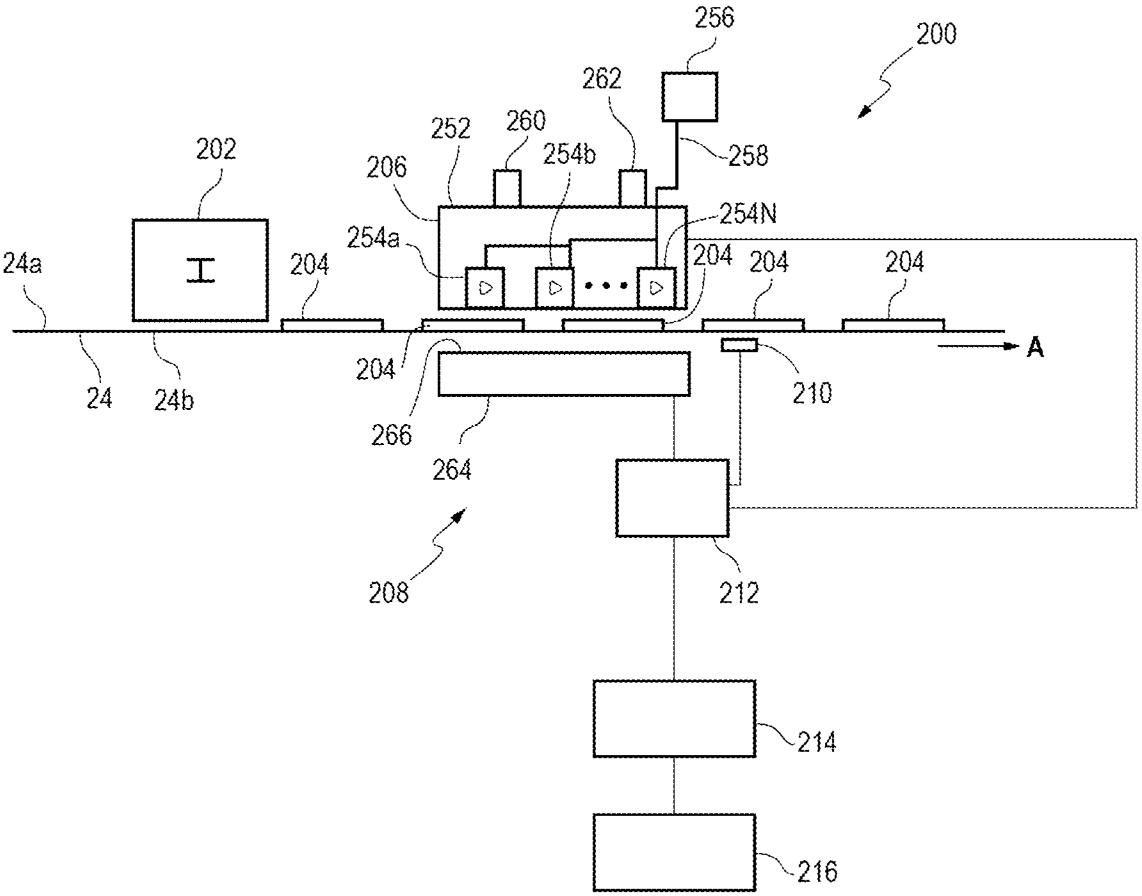
FIG. 3 is a simplified block diagram of a dryer unit of the system of FIG. 1.

FIG. 3 shows an embodiment of a dryer unit 200 (which may be any of the dryer units 32, 46, 64, 80, and 84) that may be used to dry material deposited on the web 24 by an imaging unit 202 (which may be any of the imaging units 30, 44, 60, 70, and 82).

Referring to FIG. 3, as described above, the web 24 is transported by the web transport along a direction designated by an arrow A past the imaging unit 202 that deposits the material 204 and then the dryer unit 200 that dries the material 204 deposited on the web 24. The dryer unit 200 includes a temperature regulated heating apparatus 206 that applies heat to the material 204 and a temperature regulated cooling apparatus 208 that cools the web 24. A temperature sensing device 210 is disposed downstream of the heating apparatus 206 and the temperature regulated cooling apparatus 208 wherein the device 210 develops an indication of a temperature of the web 24 as the web 24 is transported past the temperature sensing device 210. In some embodiments, the temperature sensing device 210 may be a temperature sensor that directly or remotely senses the temperature of the web 24 while in other embodiments, the temperature sensing device 210 may comprise a temperature sensor that directly or remotely senses the temperature of a heat conductive material (such as a metal roller or a metal plate) in contact with the web 24 to develop an indication of the temperature of the web 24. Direct sensing may be accomplished by a thermistor or other contact-type device in direct contact with the web or heat conductive material while a remote sensor may comprise an infrared sensor or other non-contact device.

Operation of each dryer unit 200 comprising the dryer units 32, 46, 64, 80, and 84 (FIG. 1) is controlled by an associated closed-loop dryer controller 212 that is configured by a global dryer control system 214. In particular, before a production run (or print job) is begun, the global dryer control system 214 receives information regarding the production run from the print management control system 130 (FIG. 1) including characteristics of the substrate that comprises the web 24 and characteristics and amount of the material 204 that is to be deposited on the web 24. The global dryer control system 214 uses such information to configure the closed-loop dryer controller 212 to develop an indication of (1.) a minimum temperature the web 24 must reach to dry material 204 deposited thereon by the imager unit 202 associated with the closed-loop dryer controller 212 and (2.) a maximum temperature that a temperature of the web 24 cannot exceed to prevent shrinking of or damage to the web 24. The global dryer control system 214 also develops an indication of a maximum speed at which the web 24 may be conveyed to ensure that the web 24 has sufficient heater dwell time (i.e., exposure to the heat generated by heating apparatus 206) to dry the deposited material 204 and configures a transport control 216 to set an initial conveyance speed of the web 24.

During the production run, the closed-loop controller 212 operates the heating apparatus 206 to ensure that sufficient heat is generated to dry the deposited material 204 and concurrently monitors the indication of a temperature of the web 24 developed by the temperature sensing device 210 to ensure that the temperature of the web 24 does not become so great as to damage the web 24 (e.g., cause the web to shrink). In one embodiment if such temperature reaches or exceeds a predetermined maximum temperature, such as a maximum allowable temperature for the web 24 during the production run, the closed-loop controller 212 operates the temperature regulated cooling apparatus 208 to reduce the temperature of the web 24 as described below.

In one or more other embodiments, the cooling apparatus may be operated according to one or more different/additional parameters, such as the rate of change of web temperature.

In some embodiments, the closed-loop controller 212 receives data or signals from additional sensor(s) (not shown) disposed downstream of the heating apparatus 206 to determine if the material 204 deposited on the web 24 is being dried sufficiently. Such sensor(s) may include a camera, a temperature sensor, and other sensor(s) apparent to those who have ordinary skill in the art.

In one embodiment, the heating apparatus 206 includes a housing 252. One or more heaters 254*a*-254N are disposed in the housing 252 and arranged to direct heat toward the face 24*a* of the web 24 as such web is transported thereby.

In one embodiment, the heaters 254 direct heated air toward the material 204 disposed on the web 24 to dry such material. In some embodiments, the heaters 254 receive a source of heated air from an air source 256 such as one or more blowers via one or more ducts 258. The air supplied by the air source 256 may be heated to a predetermined base temperature and supplied to the heaters 254, which may then further heat the heated air supplied thereto as directed by the closed-loop dryer controller 212. The air flow velocity and/or temperatures supplied by the heaters 254 may all be the same or the air flow velocities and/or air flow temperatures supplied by one or more of the heaters may be different. This may be undertaken to account for the fact that there is a relatively high solvent content in the material 204 at upstream portions (such as at the heater 254*a*) as compared to solvent content at downstream portions including the heater 254N. Accordingly, it may be desirable to operate the heater 254*a* and other upstream heaters 254 at higher temperature(s) to evaporate solvent more quickly than at downstream heaters 254 the heater 254N. Also, as should be evident to one of skill in the art, it may be possible to operate upstream heaters 254 at higher temperatures than downstream heaters 254 because of evaporative cooling effects on the web, which are greater at upstream web portions than downstream portions. In general, the use of higher temperature drying air allows for more rapid drying, provided that the air is not heated to temperatures that may adversely affect the web 24.

Solvent that is evaporated by heating the material 204 is drawn away from the web 24 through the housing 252 and further is drawn away from the heating apparatus 206 through one or more exhaust(s) 260. In some embodiments, the exhaust 260 includes a fan (not shown) that draws air from the housing and through the exhaust 260. In some embodiments, the closed-loop dryer controller 212 adjusts the speed of the fan to control the rate at which solvent is evacuated from the housing. For example, the fan speed may be increased as the temperature at which the heaters 254 are operated increases because the higher heater temperature results in more solvent vapor that needs to be removed. In addition, air vents or ports (not shown) may be disposed in the housing 252 proximate the heaters 254 to facilitate drawing vapor into the housing 252 away from the web 24 and through the exhaust 260. In addition, in some embodiments, the closed-loop dryer controller 212 may determine the speed of the fan in accordance with the maximum volume of material 204 per area that is expected be deposited by the imaging device 202 during a production run. In some embodiments, the global dryer control system 214 provides such volume information to the closed-loop dryer controller 212 in accordance with characteristics of the production run.

In some embodiments, the heaters 254 are infrared heaters that direct infrared radiation toward the material 204 deposited on the web 24. It should be apparent that in such embodiments the blower 256 and the ducts 258 may not be necessary. In such embodiments, the housing 252 may include one or more air makeup (or intake) port(s) 262 that supplies air into the housing 252 to balance the air (and solvent) exhausted through the air exhaust port 260. It should be apparent to one who has ordinary skill in the art that the heaters 254 may comprise other types of heat generating devices. In some cases, a fan (not shown) may be disposed in the air intake 262 to draw fresh air into the housing 252. Further, air drawn through the air intake 262 may be passed through one or more filter(s) (not shown) to prevent debris from entering the housing 252. Although, FIG. 3 shows the exhaust 260 and air intake 262 disposed at a top of the housing, it should be apparent to one who has ordinary skill in the art that the exhaust 260 and air intake 262 may disposed at any location. Further, as noted above the housing may have multiple exhausts 260 and/or air intakes 262 disposed thereon.

The temperature regulated cooling apparatus 208 includes one or more chilling devices 264 disposed proximate or in contact with the web 24 and opposite the heating apparatus 206. In some embodiments, the chilling device 264 is a heat conductive slab over which the web 24 is transported and has a generally planar surface. In other embodiments, the chilling device 264 comprises one or more heat conductive cylinders or rollers. In some embodiments, the chilling devices comprise a heat conductive metal including aluminum, stainless steel, and the like.

The heating apparatus 206 and the chilling device(s) 264 are disposed such that the web 24 is transported therebetween and the side 24*a* of the web 24 on which the material 204 has been deposited faces the heating apparatus 206. In a preferred embodiment, each chilling device 264 is disposed such that the side 24*b* of the web 24 contacts a chilled surface 266 of the chilling device 264. In other embodiments, each chilling device 264 may be disposed so that that the side 24*b* of the web 24 is sufficiently near the chilled surface 266 so that heat from the web 24 is transferred to the chilled surface 266. As described below, the chilling device(s) 264 are is configured to reduce the temperature of web 24 while the material 204 disposed on the web 24 is heated by the heating apparatus 206. Although the surface 266 of the chilling devices has a temperature less than that of material 204 disposed on the web 24, such temperature is still higher than the ambient temperature of the environment in which the printing system 20 and, thus, the heating apparatus 206 and the cooling apparatus 208, are disposed to maintain a temperature of the web 24 that facilitates drying of the material 204 disposed thereon. As would be appreciated by one of ordinary skill in the art that such temperature of the web 24 is higher than the ambient temperature.

Figure 4:
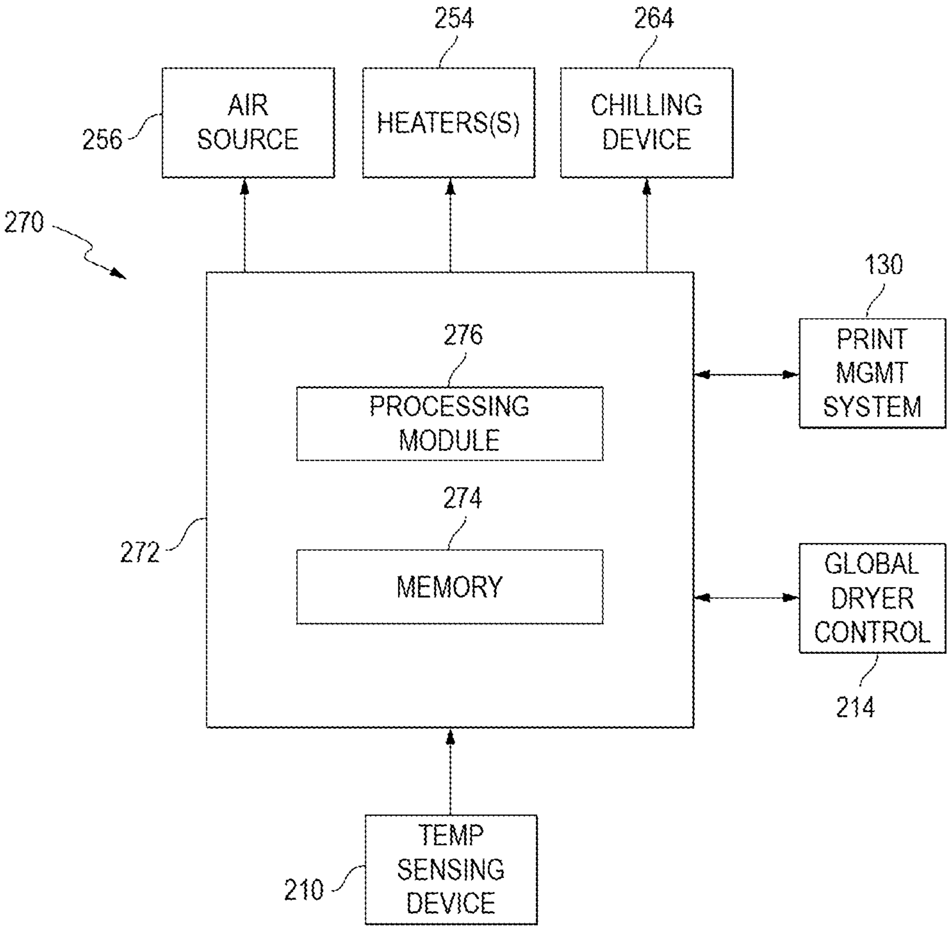
FIG. 4 is a simplified block diagram of a closed-loop controller of the dryer unit of FIG. 3.

FIG. 4 illustrates a computer system 270 especially adapted to implement the closed-loop controller 212, it being understood that any or all of the control systems, such as one or more of the control system(s) or controllers 120, 130, 212, and 214 may be implemented by like computer systems or by the computer system 270. Thus, for example, the computer system 270 may comprise one or more processing unit(s) 272. Each processing unit 272 may comprise a personal computer, server, or other programmable device having a memory 274 that, among other things, stores programming instructions executed by one or more processing module(s) or controller(s) 276 to implement the closed-loop dryer controller 212. The one or more processing module(s) 276 receive(s) signals from the temperature sensing device(s) 210 and other sensor(s) and controls operation of the heaters 254, the air source(s) 256, and the chilling device(s) 264. Further, the one or more processing module(s) 276 communicate with the print management control system 130 and global dryer control system 214.

Figure 5:
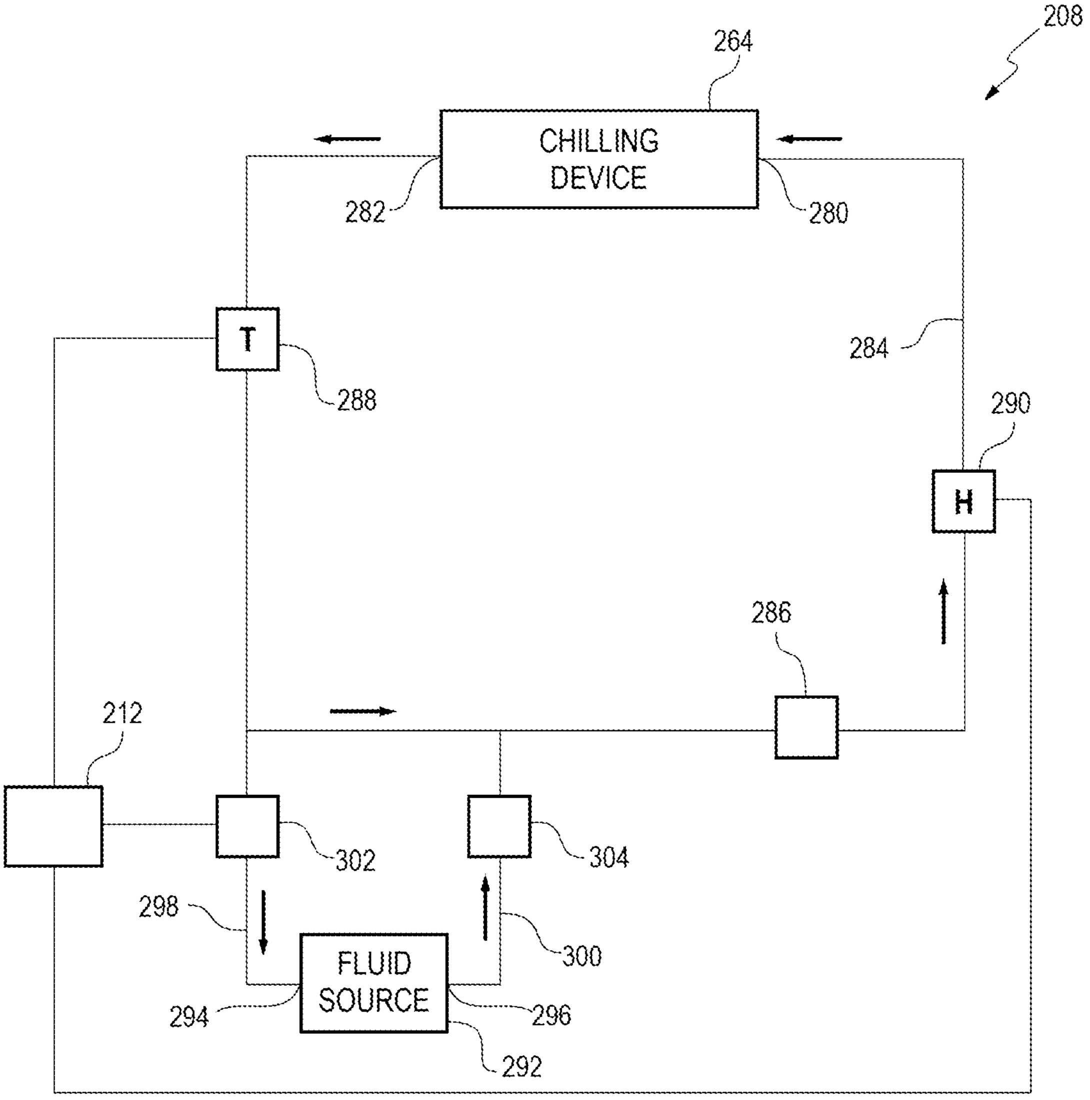
FIG. 5 is a simplified block diagram of a temperature regulated cooling apparatus of the dryer unit of FIG. 3.

FIG. 5 shows an embodiment of the temperature regulated cooling apparatus 208 that uses a single chilling device 264. In such embodiment, the chilling device 264 includes an input port 280 and an output port 282. A first fluid line 284 couples the input port 280 and the output port 282. A pump 286 operates to circulates fluid in the first fluid line 284, through the input port 280, through the chilling device 264, through the output port, and into the first fluid line 284. A temperature sensing device 288 senses the temperature of the fluid proximate the output 282. In addition, a fluid heater 290 is disposed in the first fluid line 284 between the pump 286 and the input port 280.

The temperature regulated cooling apparatus also includes a chilled fluid source 292 that has an input port 294 and an output port 296. The input port 294 is coupled to a second fluid line 298 and the output port 296 is coupled to a third fluid line 300. The second fluid line 298 and third fluid line 300 are fluidically coupled to the first fluid line 284. An electrically operated valve 302 is disposed in the second fluid line 298 that, when closed, prevents transport of fluid in the first fluid line 284 into the second fluid line 298, and thus into the input port 294 of the chilled fluid source 292. In addition, a pressure regulator 304 is disposed into the third fluid line 300 that draws fluid from the chilled fluid source 292, through the output port 296, through the third fluid line 300, and into the first fluid line 284 if fluid pressure in the first fluid line 284 drops below a predetermined level.

During operation, the closed-loop dryer controller 212 monitors a temperature sensed by the temperature sensing device 288. If such temperature is below a predetermined minimum web temperature, the closed-loop dryer controller 212 operates the fluid heater 290 to raise the temperature of the fluid in the fluid line 284 that is supplied to the chilling device 264 via the input port 280.

If the temperature sensed by the temperature sensing device 288 is equal to or exceeds a predetermined maximum temperature, the closed loop dryer controller 212 opens the valve 302 to cause fluid in the first fluid line 284 to be drawn into the second fluid line 298 and into the chilled fluid source 292, where such fluid is cooled. Such drawing of fluid into the second fluid line 298 causes a pressure drop in the first fluid line 284, which in turn causes the pressure regulator 304 to draw chilled fluid from the chilled fluid source 292, through the output port 296, into the third fluid line 300, and into first fluid line 284. Drawing chilled fluid into the first fluid line 284 in this manner reducing the temperature of the fluid that is provided to the chilling device 260 via the input port 280 and reduces the temperature of the chilling device 260 and the surface 266 thereof.

Figure 6:
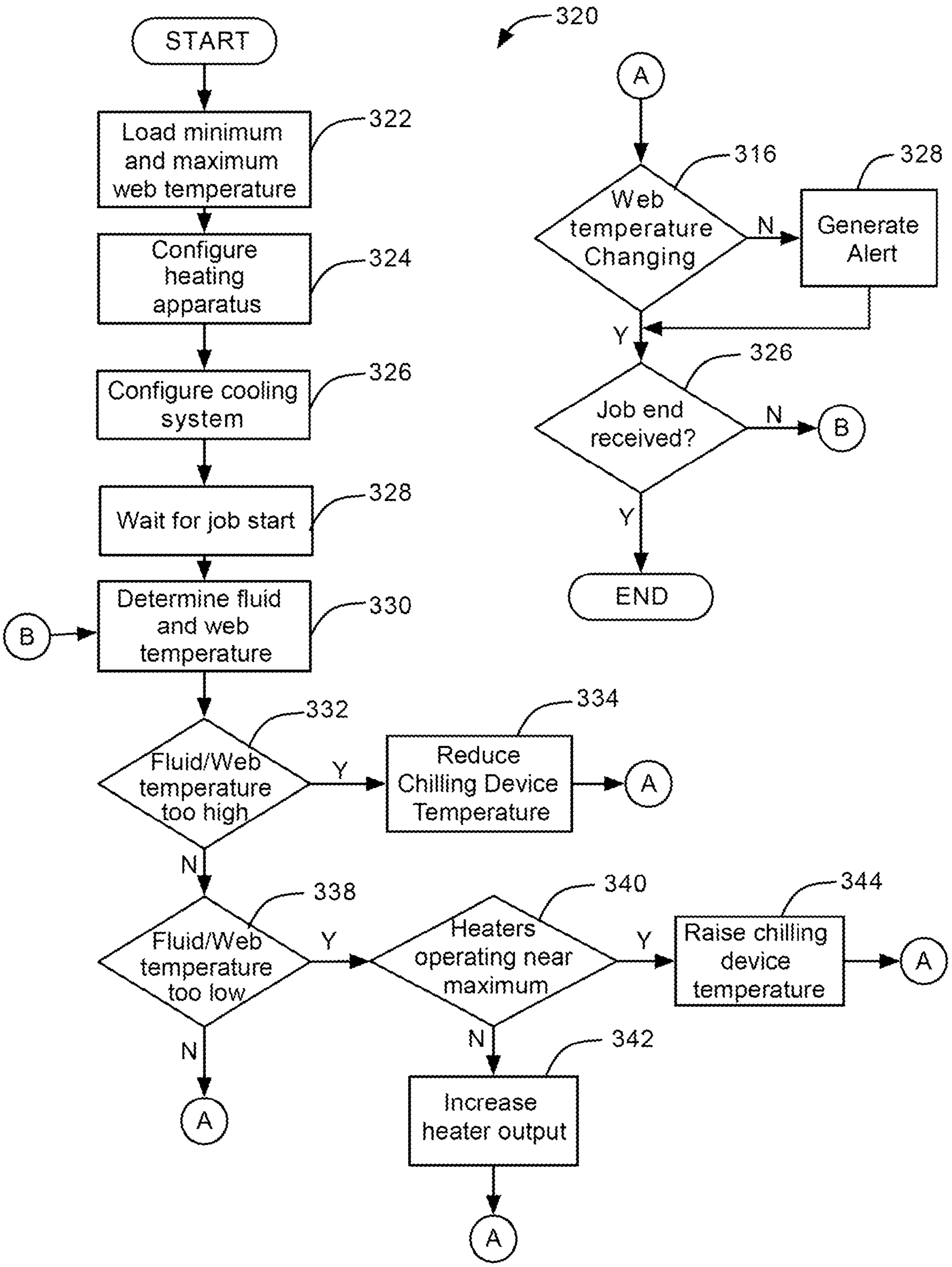
FIG. 6 is a flowchart of steps undertaken by the closed-loop controller of FIG. 4.

FIG. 6 is a flowchart 320 of the steps undertaken by the closed-loop controller 212 to operate the temperature regulated cooling apparatus 208.

At step 322, the closed-loop controller 212 receives the minimum and maximum web temperatures from the global dryer control system 214. For a particular production run, in some embodiments, the global dryer control system 216 determines a maximum temperature that such substrate may reach without damage based on the characteristics of the substrate that comprises the web 24. For example, if a particular substrate that comprises the web 24 begins to be impaired or altered (e.g., shrink, expand, deform, etc.) at a temperature of 130° F. (about 54° C.), the maximum web temperature may be set to 125° F. (about 52° C.).

In some embodiments, the global dryer control system 214 calculates the minimum web temperature in accordance with the maximum web temperature, for example, by multiplying the maximum web temperature by a predetermined value between zero and one. In some embodiments, such predetermined value is between about 0.85 and about 0.98. In other embodiments, such predetermined value is between about 0.90 and about 0.98, and in still other embodiments, such predetermined value is between about 0.95 and about 0.97. In other embodiments, the global dryer system 214 analyzes the images to be printed during the production job to determine the maximum volume of material per area of material 204 that will be deposited by the imaging device 202 on the substrate and determines a minimum web temperature that is necessary to dry such volume of material 204.

Referring once again to FIG. 6, at step 324, the closed-loop dryer controller 212 configures the heating apparatus 206. In particular, the closed-loop dryer controller 212 selects the heaters 254 that are to be operated during the production run and the amount of heat each heater 254 should generate so the web will be at least at the minimum web temperature. In addition, if the heaters 254 direct heated air toward the web 24, the closed-loop dryer controller 212 may select the base temperature of the air flow generated by the air supply 256.

At step 326, the closed-loop dryer controller 212 operates the valve 302 or the heater 290 as necessary so that the temperature of the fluid in the first fluid line 284 as sensed by the temperature sensor 288 is at a predetermined initial temperature. In one embodiment, the predetermined initial temperature is selected to be a fraction of the maximum web temperature. For example, if the maximum web temperature is 125° F. (about 54° C.), the initial temperature is set to 100° F. (about 38° C.). In other embodiments, the predetermined initial temperature is the minimum web temperature. It should be apparent to one who has ordinary skill in the art that if the production system is idle for a period of time, the temperature of the fluid in the first fluid line 284 (and thus the chilling device 264) may drop toward the ambient temperature. The closed-loop dryer controller 212, at step 326, ensures the chilling device 264 is at least at the predetermined initial temperature. Further, it should be apparent to one who has ordinary skill in the art that such predetermined initial temperature may vary from production run to production run depending on the characteristics (e.g., substrate, amount of material to be deposited, and the like) of such production runs.

At step 328, the closed-loop dryer controller 212 waits to receive a job start signal from the print management control system 130. While waiting to receive the job start signal at step 328, the closed-loop dryer controller 212 operates the temperature regulated cooling apparatus 208 as described above to ensure that the temperature of the chilling apparatus 264 is maintained at at least the predetermined initial temperature.

Thereafter, at step 330, the closed-loop dryer controller 212 receives an indication of the temperature of the fluid in the first fluid line 284 from the temperature sensing device 288. In some embodiments, the closed-loop dryer controller 212 also receives an indication of the temperature of the web from the temperature sensing device 210.

At step 332, the closed-loop dryer controller 212 determines if the indication of the temperature of the fluid developed by the temperature sensing device 288 or, in some embodiments, of the web 24 developed by the temperature sensing device 210, is higher than the maximum web temperature and if so, at step 334, the closed-loop dryer controller 212 operates the valve 302 to draw heated fluid from the first fluid line 284 into the second fluid line 298. As disclosed above, drawing the heated fluid in this manner from the first fluid line 284 results in introducing chilled fluid from the third fluid line 300 into the first fluid line 284, thus reducing the temperature of the chilling device 264. Thereafter, the closed-loop dryer controller 212 proceeds to step 336.

If at step 332, the closed-loop dryer controller 212 determines that the indication of the temperature of the fluid in the first fluid line 284 is less than the maximum web temperature, the closed-loop dryer controller 212, at step 338, determines whether such indication is less than the minimum temperature for such fluid. If the temperature of the fluid is above such minimum temperature, the closed-loop dryer controller 212 proceeds to step 336.

Otherwise, at step 340 the closed-loop dryer controller 212 determines whether the heater(s) 254 are operating at or near their maximum capacity. If not, at step 342 the closed loop controller increases the output of one or more heater(s) and proceeds to step 336.

If at step 340 the closed-loop dryer controller 212 determines the heater(s) 254 are operating at maximum capacity, the closed-loop dryer controller 212, at step 344, operates the heater 290 in the first fluid line 284 to raise the temperature of the fluid therein and thus the temperature of the chilling device 264. Thereafter the closed-loop dryer controller 212 proceeds to step 336.

During operation, closed-loop dryer controller 212 tracks whether the web temperature is affected by the adjustments made at steps 334, 342, and/or 344. At step 336, the closed-loop dryer controller 212 determines whether such adjustments are affecting the fluid and web temperature as expected and if so proceeds to step 346. Otherwise, if the adjustments are not affecting the temperature of the fluid and/or the temperature of the web 24 is at risk of exceeding the maximum web temperature or falling below the minimum web temperature, the closed-loop dryer controller 212, at step 348, generates an error signal to the print management control system 130 that damage to the web 24 or insufficient drying of the material 204 may occur, and in response the print management control system 130 may stop the production job. After generating such signal, the closed-loop dryer controller 212 proceeds to step 344.

At step 346, the closed-loop dryer controller 212 determines if a signal has been received that indicates that the production run has ended and if so, control terminates. Otherwise, the closed-loop dryer controller 212 returns to the step 330 to continue monitoring and controlling the temperature of fluid in the first fluid line 284 and thus the chilling device 264 and web 24.

Figure 7:
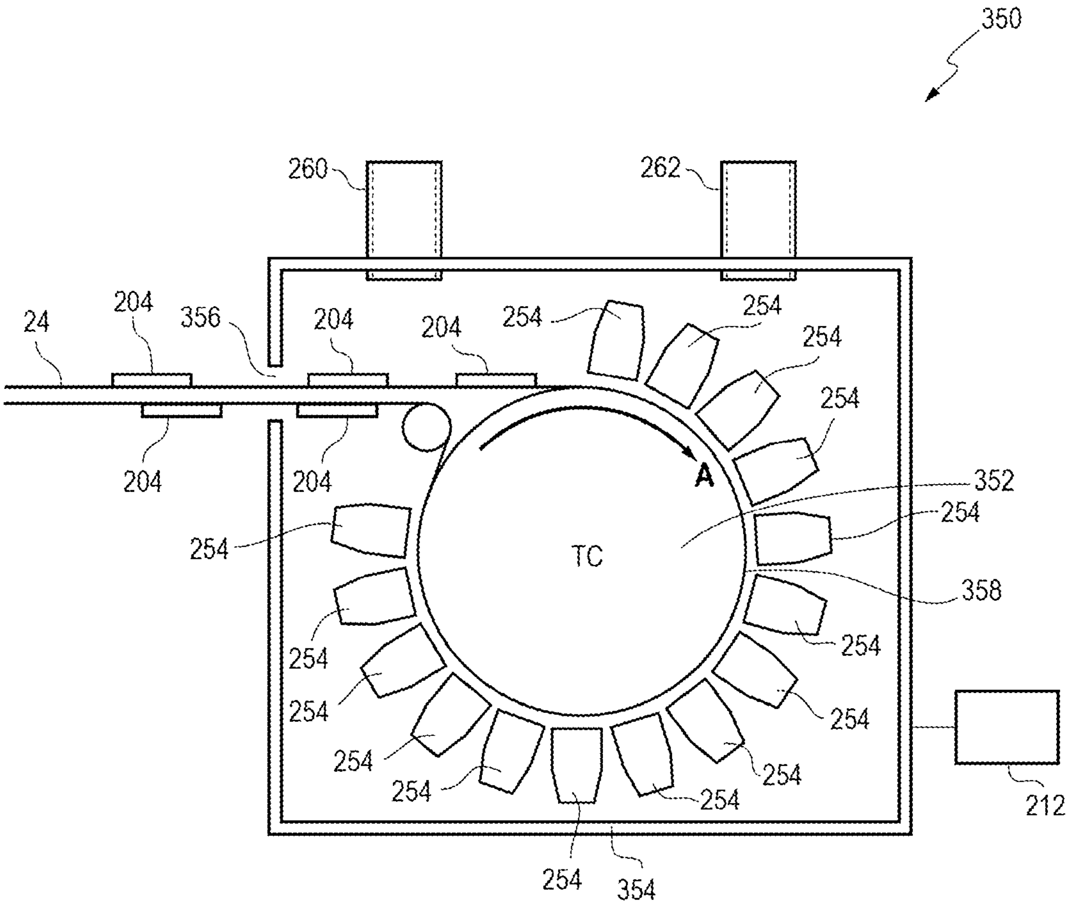
FIG. 7 is a simplified block diagram of another dryer unit of the system of FIG. 1.

FIG. 7 shows an embodiment 350 of the dryer unit 200 in which the temperature regulated cooling apparatus 208 includes a cylindrical chilling device 352. Further, the heating apparatus 206 and the temperature regulated cooling apparatus 208 are enclosed within a common housing 354. As with the housing 252 described above, the housing 354 includes an exhaust 260 to draw evaporated solvent away from the dryer unit 200 and an air makeup 262 that introduces air into the dryer unit 200, if necessary.

The housing 352 includes a port 356 through which the web 24 enters and exits the housing 354. In particular, after material 204 is deposited thereon by the imaging system 202, the web 24 is guided by one or more rollers (not shown) into the housing 354 through the port 356. The web 24 is then disposed on a surface 358 of the cylindrical chilling device 352. In some embodiments, the cylindrical chilling device 352 is rotationally driven in a direction represented by an arrow A by the transport control 216 and facilitates transport of the web 24 through the housing 354. In other embodiments, the chilling device comprises an idler roll that is not actively driven, but which rotates in response to the movement of the web thereover. One or more heaters 254 are disposed about a circumference of the cylindrical chilling device 352 such that the web 24 passes between the surface 358 of the cylindrical chilling device 352 and the one or more heaters 254. After being dried by the last heater 254N (i.e., the heater 254 farthest downstream from the imaging unit 202) of the dryer unit 200, the web 24 is guided by one or more rollers (not shown) out of the housing 354 through the port 356 (or a different port). The cylindrical chilling device 352 is coupled to the chilled fluid source 292 (FIG. 5) and the temperature of the surface 358 of the cylindrical chilling device 352 is controlled by the closed-loop dryer controller 212 in a manner identical to that described above in connection with the chilling device 264.

Figure 8:
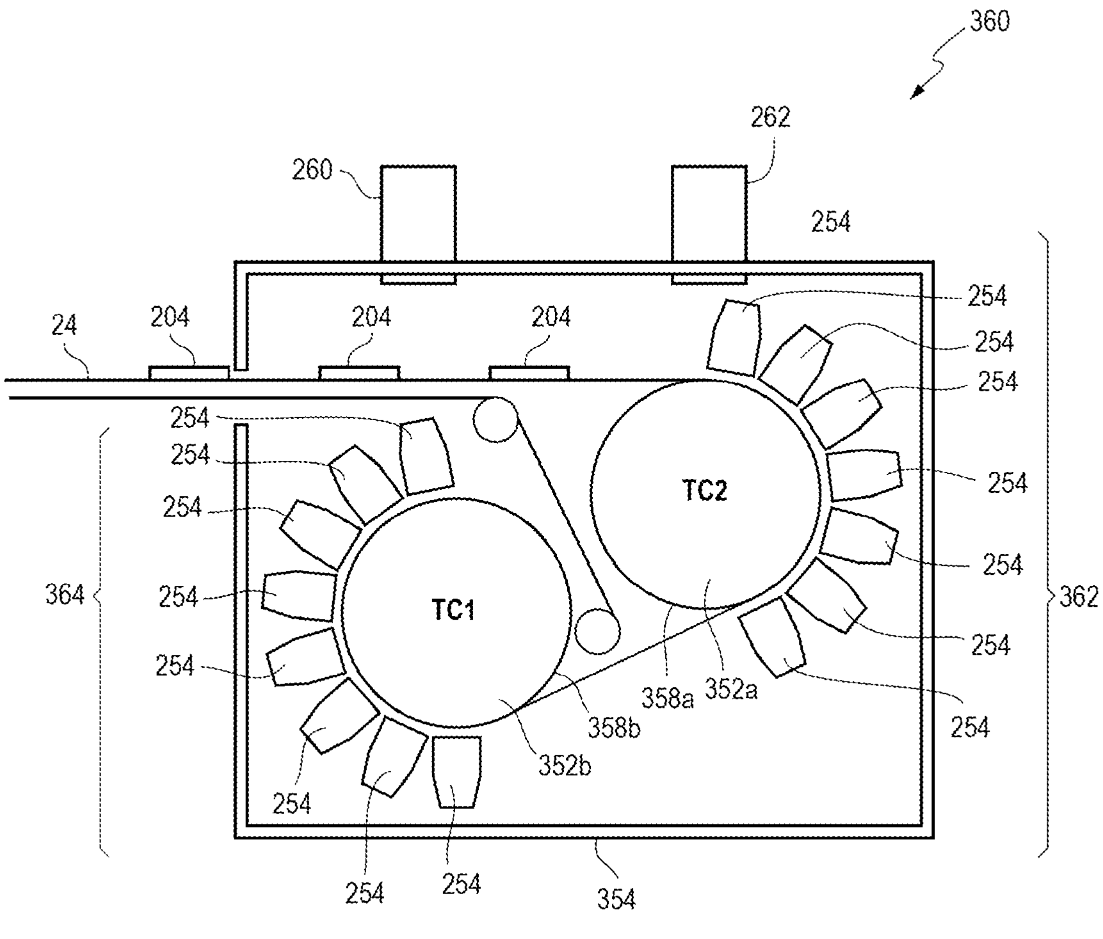
FIG. 8 is a simplified block diagram of a further dryer unit of the system of FIG. 1.

In some embodiments, the dryer unit 200 may comprise a plurality of chilling devices 352. FIG. 8 shows an embodiment 360 that is substantially identical to the embodiment 350 of the dryer unit 200 shown in FIG. 7, except a first subset 362 of the heaters 254 of such dryer unit 200 are circumferentially arranged about a first cylindrical chilling device **352*a* and a second subset 364 are circumferentially arranged about a second cylindrical chilling device 352*b*. The web 24 is guided along a surface 358*a* of the first cylindrical chilling device 352*a* such that the web 24 travels between the first chilling device 352*a* and the first subset 362 of heaters 254 and then along a surface 358*b* of the second cylindrical chilling device 352*b* and the second subset 364 of heaters 254. One or both of the cylindrical chilling devices 352*a* and 352*b* may be rotationally driven by the transport control 216 to facilitate transport of the web 24 through the dryer unit 200** or one or both of the devices may comprise idler rollers.

Figure 9:
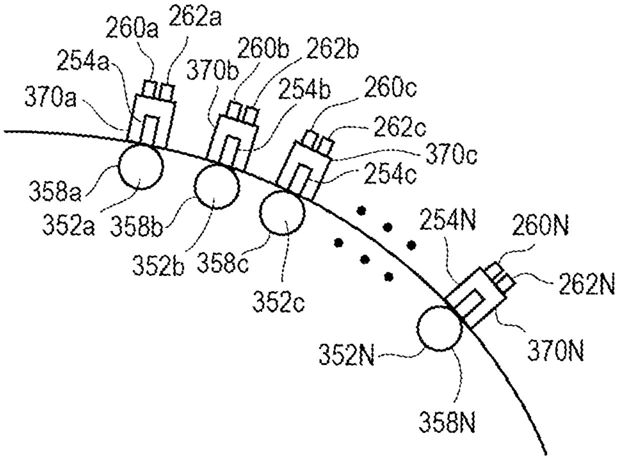
FIG. 9 is a simplified block diagram of a portion of yet another dryer unit of the system of FIG. 1.

In some embodiments, the dryer unit 200 may comprise one chilling device 352 or more than one chilling device 352 for each heater 254. Referring to FIG. 9, an embodiment 368 of the dryer unit 200 includes a plurality of heaters **254*a*-254N and a plurality of chilling devices 352*a*-352N associated therewith, respectively. Each of the plurality of heaters 254*a*-254*n* is disposed such that the web 24 is transported between such heaters 254*a*-254N and surfaces 358*a*-358N of the cylindrical chilling device 352*a*-352N, respectively. In some embodiments, each heater 254*a*-254N is disposed in a housing 370*a*-370N, respectively. Further, each housing 370*a*-370N comprises an exhaust 260*a*-260N, respectively, and an optional air makeup 262*a*-272N, respectively. As should be evident, more than one or all of the heaters 254*a*-254N may be disposed in a single or any number of multiple housings 370. In one embodiment, one or more of the chilling devices 352*a*-352N may comprises idler rollers or may comprise driven rollers to facilitate active transport of the web 24** thereby.

Although the embodiments 350, 360, and 368 illustrate the use of cylindrical chilling devices 352, it should be apparent that any combination of the slab chilling device(s) 264 and cylindrical chilling device(s) 352 may be used in such embodiments.

It should be apparent to those who have skill in the art that any combination of hardware and/or software may be used to implement the supervisory system 120, the print management control system 130, the closed-loop dryer controller 212, the global dryer control system 214, and the transport control 216 described herein. It will be understood and appreciated that one or more of the processes, sub-processes, and process steps described in connection with FIGS. 1 and 3-5 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1 and 3-5. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the supervisory system 120, the print management control system 130, the closed-loop dryer controller 212, the global dryer control system 214, and the transport control 216), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

In summary, a dryer system 200 is disclosed herein that concurrently directs heat toward a web 24 to dry material 204 deposited on a web 24 and chills the web 24. In this manner, sufficient heat may be applied to the material 204 without damaging the web 24, especially a shrinkable web 24. Further, the heaters used to dry the material 204 may be operated to generate a greater amount of heat than would be possible without chilling the web 24. Accordingly, fewer heaters 254 and thus, less space to house such heaters may be necessary than if the web 24 were not chilled.

Efficient drying (i.e., reduced speed, reduced number heaters required, reduced dwell time, etc.) of the material 204 deposited on the web 24 may obtained by holding the temperature of the web 24 at a relatively high temperature (i.e., the minimum web temperature) yet below a temperature at which the web 24 may be damaged or undesirably altered (i.e., the maximum web temperature).

It should be apparent to one who has ordinary skill in the art that the embodiments of the dryer 200 disclosed herein may be adapted to dry any type of material 204 deposited on any type of substrate using heat and/or a flow of heated air. The particular embodiments disclosed herein are especially useful to dry water-based inks, although other inks might alternatively be dried by the dryer 200. Further, it should be apparent such embodiments may be adapted to dry material 204 deposited on a substrate using any type of material deposition process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only and should not be taken as limiting the scope of the disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dryer system, comprising:
- a heating apparatus;
- a cooling apparatus;
- a first temperature sensing device;
- a second temperature sensing device;
- a controller; and
- a web transport adapted to convey a printed shrinkable web between the heating apparatus and the cooling apparatus;
- wherein the heating apparatus is adapted to direct heat toward the web and the cooling apparatus is adapted to concurrently chill the web, the first temperature sensing device is adapted to develop a first indication of a temperature of the cooling apparatus, the second temperature sensing device is adapted to develop a second indication of a temperature of the printed shrinkable web, and the controller is adapted to adjust a temperature of at least one of the heating apparatus and the cooling apparatus in accordance with the first and second indications.

2. The dryer system of claim 1, wherein the cooling apparatus includes a chilling device and a source of chilled fluid, wherein the controller is adapted to control transport of chilled fluid from the source of chilled fluid to the chilling device to adjust the temperature.

3. The system of claim 1, wherein the web is in contact with the cooling apparatus.

4. The system of claim 3, wherein the cooling apparatus is a chilled cylinder.

5. The system of claim 4, wherein the heating apparatus comprises a plurality of heaters and the plurality of heaters are disposed about a circumference of the chilled cylinder, and the web is transported between the chilled cylinder and the plurality of heaters.

6. The system of claim 3, wherein the cooling apparatus comprises first and second chilled cylinders and the heating apparatus comprises a first plurality of heaters disposed about a circumference of the first chilled cylinder and a second plurality of heaters disposed about a circumference of the second chilled cylinder.

7. The system of claim 6, further including a housing and the cooling apparatus and the heating apparatus are disposed in the housing.

8. The system of claim 3, wherein the cooling apparatus comprises a plurality of chilled cylinders and the heating apparatus comprises a plurality of heaters, wherein each of the plurality of chilled cylinders is associated with one of the plurality of heaters.

9. The system of claim 8, wherein each of the plurality of heaters is disposed in a housing and the housing includes an exhaust and an air intake.

10. The system of claim 1, wherein the heating apparatus comprises an infrared heater that directs heat toward the web.

11. The system of claim 1, wherein the cooling apparatus includes a fluid line having fluid therein and the temperature sensing device develops an indication of a temperature of the fluid.

12. The system of claim 1, wherein the cooling apparatus includes a first fluid line coupled to a chilling device through which a fluid circulates, a second fluid line coupled to a source of chilled fluid, and the controller is adapted to reduce the temperature of the chilling device by causing fluid from the first fluid line to be drawn into the second fluid line.

13. The system of claim 1, wherein the cooling apparatus includes a fluid line coupled to a chilling device through which a fluid circulates and the controller is adapted to operate a heater to heat the fluid to raise a temperature of the cooling apparatus.

14. The system of claim 1, wherein the cooling apparatus is operated above an ambient temperature where the drying system is disposed.

15. A method for drying a material deposited on a shrinkable web, comprising the steps of:
- conveying a printed shrinkable web between a heating apparatus and a cooling apparatus;
- operating the heating apparatus to direct heat toward the web;
- operating the cooling apparatus to cool the web concurrently with the operation of the heating apparatus;
- receiving an indication of a temperature of the cooling apparatus;
- reviving an indication of a temperature of the printed shrinkable web; and
- adjusting a temperature of at least one of the heating apparatus and the cooling apparatus in accordance with the indication of the temperature of the cooling apparatus and the printed shrinkable web.

16. The method of claim 15, operating the cooling apparatus includes a chilling device and the step of adjusting the temperature of the cooling apparatus includes the step of transporting a chilled fluid between the chilling device and source of chilled fluid.

17. The method of claim 15, wherein the step of conveying the web includes the step contacting the web with the cooling apparatus.

18. The method of claim 17, wherein the step of contacting the web comprises the step of contacting the web with a chilled cylinder.

19. The method of claim 18, wherein the heating apparatus comprises a plurality of heaters and the plurality of heaters are disposed about a circumference of the chilled cylinder, and the step of conveying the web comprises the step of transporting the web between the chilled cylinder and the plurality of heaters.

20. The method of claim 15, wherein the step of receiving an indication of a temperature of the cooling apparatus comprises sensing a temperature of a fluid in the cooling apparatus.

* * * * *